(12) United States Patent
Roth et al.

(10) Patent No.: US 10,103,617 B2
(45) Date of Patent: Oct. 16, 2018

(54) REGULATOR CIRCUIT AND METHOD OF OPERATING REGULATOR CIRCUIT

(71) Applicant: TAIWAN SEMICONDUCTOR MANUFACTURING COMPANY, LTD., Hsinchu (TW)

(72) Inventors: Alan Roth, Leander, TX (US); Eric Soenen, Austin, TX (US); Russell Kinder, Austin, TX (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 15/590,249

(22) Filed: May 9, 2017

(65) Prior Publication Data

US 2017/0244315 A1  Aug. 24, 2017

Related U.S. Application Data

(63) Continuation of application No. 14/729,114, filed on Jun. 3, 2015, now Pat. No. 9,654,008.
(Continued)

(51) Int. Cl.
*H02M 3/158* (2006.01)
*H02M 1/14* (2006.01)
(Continued)

(52) U.S. Cl.
CPC ............. *H02M 1/14* (2013.01); *H02M 1/00* (2013.01); *H02M 3/156* (2013.01);
(Continued)

(58) Field of Classification Search
CPC .. H02M 3/158; H02M 3/1582; H02M 3/1584; H02M 2003/1586; H02M 3/157; H02M 2001/0012
See application file for complete search history.

(56) References Cited

U.S. PATENT DOCUMENTS 6,246,222 B1   6/2001  Nilles et al.
6,404,175 B1   6/2002  Yang et al.
(Continued)

FOREIGN PATENT DOCUMENTS

| CN | 1591263 | 3/2005 |
|---|---|---|
| CN | 1747298 | 3/2006 |
| CN | 100363853 | 1/2008 |

OTHER PUBLICATIONS

Office Action dated Jul. 1, 2016 from corresponding No. TW 105102316.
(Continued)

*Primary Examiner* — Gary L Laxton
(74) *Attorney, Agent, or Firm* — Hauptman Ham, LLP (57) ABSTRACT

A regulator circuit comprises: a regulator output node; at least (N+1) regulator control circuits, N being an integer greater than 1; N drivers, each one of the N drivers including: a multiplexer having an input port and an output port, the input port of the multiplexer being coupled with output nodes of the at least (N+1) regulator control circuits; an adjuster circuit configured to adjust a level of a current supplied by the driver to the regulator output node; and a task controller. The task controller is configured to: set a first one of the N+1 regulator control circuits to be idle during a first cycle of a clock signal; and set a second one of the N+1 regulator control circuits to be idle during a second cycle of the clock signal.

20 Claims, 6 Drawing Sheets

Related U.S. Application Data (60) Provisional application No. 62/008,919, filed on Jun. 6, 2014.

(51) Int. Cl.
    *H02M 1/00*    (2006.01)
    *H02M 3/156*   (2006.01)
    *H02M 7/42*    (2006.01)
    *H02M 3/157*   (2006.01)

(52) U.S. Cl.
    CPC ....... *H02M 3/1584* (2013.01); *H02M 3/1588* (2013.01); *H02M 7/42* (2013.01); *H02M 2001/0003* (2013.01)

(56) References Cited

U.S. PATENT DOCUMENTS

| | | |
|---|---|---|
| 6,459,602 B1 | 10/2002 | Lipcsei |
| 7,023,188 B1 | 4/2006 | Rice |
| 7,633,183 B2 | 12/2009 | Yang |
| 8,598,854 B2 | 12/2013 | Soenen et al. |
| 8,629,694 B1 | 1/2014 | Wang et al. |
| 8,629,706 B2 | 1/2014 | Chen et al. |
| 8,710,810 B1 * | 4/2014 | McJimsey ........... H02M 3/1584 323/272 |
| 8,816,670 B2 | 8/2014 | Lee et al. |
| 2004/0008011 A1 | 1/2004 | Wang et al. |
| 2006/0055381 A1 | 3/2006 | Rice |
| 2008/0198636 A1 | 8/2008 | Yang et al. |
| 2011/0254520 A1 | 10/2011 | Teh et al. |
| 2012/0126763 A1 | 5/2012 | Yang |
| 2012/0176186 A1 | 7/2012 | Chen et al. |
| 2013/0241510 A1 | 9/2013 | Shi et al. |
| 2013/0307516 A1 | 11/2013 | Horng et al. |
| 2013/0320944 A1 | 12/2013 | Siao |
| 2014/0002041 A1 | 1/2014 | Soenen et al. |
| 2014/0266114 A1 | 9/2014 | Chern et al. |

OTHER PUBLICATIONS

Office Action dated Jan. 29, 2016 from corresponding No. DE 10 2014 019 636.4.
Office Action dated Apr. 5, 2017 from corresponding No. CN 201610220347.6.
Notice of Allowance dated Sep. 27, 2017 with English translation from corresponding application No. KR 10-2015-0183217.

* cited by examiner

REGULATOR CIRCUIT AND METHOD OF OPERATING REGULATOR CIRCUIT

PRIORITY CLAIM

The present application is a continuation of U.S. application Ser. No. 14/729,114, filed Jun. 3, 2015, which claims the priority of U.S. Provisional Application No. 62/008,919, filed Jun. 6, 2014, which are incorporated herein by reference in their entireties.

BACKGROUND

The semiconductor integrated circuit (IC) industry has experienced rapid growth. Technological advances in IC materials and design have produced generations of ICs where each generation has smaller and more complex circuits than the previous generation. In the course of integrated circuit evolution, functional density (i.e., the number of interconnected devices per chip area) has generally increased while geometry size (i.e., the smallest component or line that can be created using a fabrication process) has decreased. The ICs have been applied in various electronic devices, and an external voltage received by the electronic devices is usually different than that for operating the ICs of the electronic devices. For example, in some applications, a mobile device receives a 3.6 V power from a battery while the ICs of the mobile device operate at a voltage level ranging from 1.8 V to 0.9 V. Moreover, in some applications, an IC receives a power supply voltage and internally operating logic circuit therein at a lower voltage level in order to obtain higher operation speed and lower power consumption. In these circumstances, direct current (DC) to DC (DC-DC) regulators are usable to convert one DC voltage level to another.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In some embodiments, a regulator circuit includes N drivers corresponding to N different phases and (N+1) regulator control circuits configured to generate N control signals corresponding to N different phases. By rotating the combinations of the N drivers and (N+1) regulator control circuits, the phase errors among control signals caused by mismatch or process variations of (N+1) regulator control circuits are evenly distributed to the N drivers in a time-averaged manner. As a result, the N drivers share the loading evenly and have balanced output currents.

Figure 1:
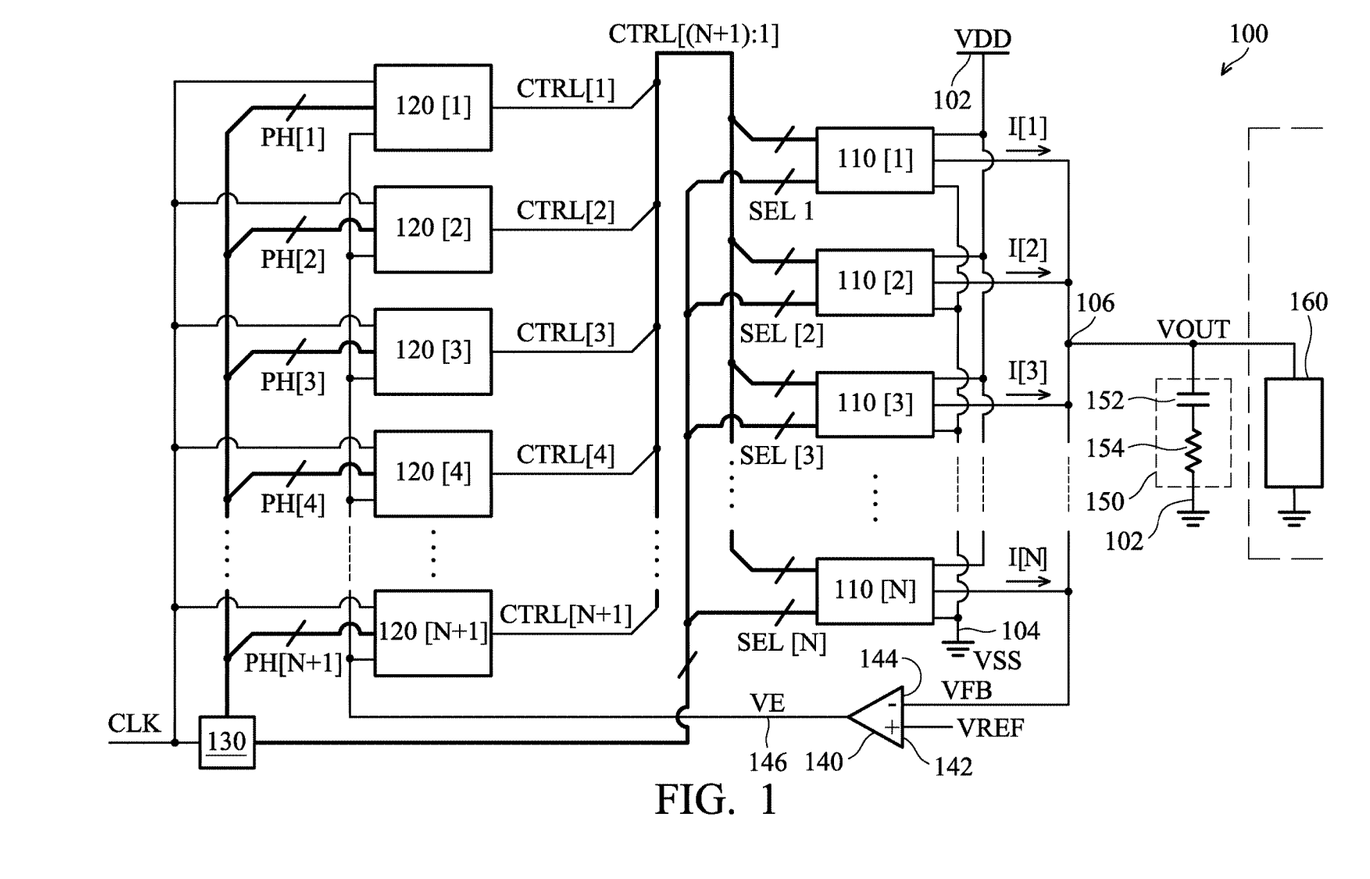
FIG. 1 is a functional block diagram of a regulator circuit in accordance with some embodiments.

FIG. 1 is a functional block diagram of a regulator circuit 100 in accordance with some embodiments. Regulator circuit 100 includes a first power supply node 102, a second power supply node 104, a regulator output node 106, N drivers 110[1], 110[2], 110[3], . . . , 110[N] coupled with regulator output node 106 and powered by a power domain defined by first and second power supply nodes 102 and 104, at least (N+1) regulator control circuits 120[1], 120[2], 120[3], 120[4], . . . , 120[N+1] coupled with N drivers 110[N:1], and a task controller 130 coupled with N drivers 110[N:1] and at least (N+1) regulator control circuits 120[(N+1):1]. Regulator circuit 100 further includes an error amplifier 140 between regulator output node 106 and at least (N+1) regulator control circuits 120[(N+1):1] and a capacitive device 150 between regulator output node 106 and second power supply node 104. A load 160 is coupled with regulator output node 106. Load 160 is not part of regulator circuit 100.

First power supply node 102 is configured to carry a voltage VDD. Second power supply node 104 is configured to carry a voltage VSS. In some embodiments, voltage VSS has a voltage level usable as a ground reference level of regulator circuit 100, and voltage VDD has a voltage level also being referred to as a supply voltage level. In some embodiments, the ground reference level is lower than the supply voltage level. In some embodiments, if the ground reference level is used to define the voltage level of 0 V, the power supply voltage level ranges from 1.2 V to 2.5 V.

Regulator circuit 100 is configured to generate a regulated DC voltage VOUT at regulator output node 106 for driving load 160. In some embodiments, voltage VOUT has a voltage level between the power supply voltage level and the ground reference level. In some embodiments, if the ground reference level is used to define the voltage level of 0 V, the voltage level of voltage VOUT ranges from 30% to 70% of the power supply voltage level.

Drivers 110[N:1] are configured to provide corresponding currents I[1], I[2], I[3], . . . , I[N] to regulator output node 106 and then to load 160. Each one of drivers 110[N:1] is configured to receive (N+1) control signals CTRL[1], CTRL[2], CTRL[3], CTRL[4], . . . , CTRL[N+1] from regulator control circuits 120[(N+1):1] and a corresponding one set of selection signals SEL[1], SEL[2], SEL[3], . . . , SEL[N]

from task controller 130. Regulator control circuits 120[1]~120[N+1] are configured to generate corresponding control signals CTRL[(N+1):1].

Regulator control circuits 120[(N+1):1] are configured to receive an error signal VE from error amplifier 140, a clock signal CLK, and (N+1) sets of phase control signals PH[1], PH[2], PH[3], PH[4], . . . , PH[N+1]. Each regulator control circuit 120[(N+1):1] is configured to generate a corresponding control signals CTRL[(N+1):1] based on the clock signal CLK, the error signal VE, and a corresponding set of phase signals PH[(N+1):1]. Task controller 130 receives the clock signal CLK and is configured to set each one of regulator control circuits 120[(N+1):1] to generate a control signal CTRL[(N+1):1] corresponding to N different phases in a rotational manner. In some embodiments, the N phases are defined based on a frequency and a phase of the clock signal CLK. Also, at any given time during the operation of regulator circuit 100, N regulator control circuits of regulator control circuits 120[(N+1):1] are configured to variously generate N control signals corresponding to N different phases.

Task controller 130 is further configured to set the drivers 110[N:1] such that a p-th driver 110[p] is operated based on control signals corresponding to a p-th phase of the N different phases from the regulator control circuits 120[(N+1):1] in a rotational manner, where the index "p" is an integer ranging from 1 to N. Thus, at any given time during the operation of regulator circuit 100, the p-th driver 110[p] is configured to provide the p-th current I[p] to the regulator output node 106 based on a control signal of the N control signals that corresponds to the p-th phase, e.g., CTRL[p] among CTRL[N:1] from regulator control circuits 120[N:1].

In addition, task controller 130 is configured to set another regulator control circuit, e.g., regulator control circuit 120[N+1], to generate another control signal CTRL[N+1] corresponding to the p-th phase of the N different phases. Task controller 130 is also configured to set the p-th driver 110[p] to provide the p-th current I[p] based on the another control signal CTRL[N+1] in place of the control signal CTRL[p], which corresponds to the p-th phase and is currently used by the p-th driver 110[p]. In some embodiments, the rotation of the combinations of using regulator control circuits 120[(N+1):1] for N different phases includes replacing one of working regulator control circuits with an idle regulator control circuit during each clock cycle of clock signal CLK.

Error amplifier 140 has a non-inverted input 142 configured to receive a reference voltage VREF, an inverted input 144 configured to receive a feedback voltage VFB, and an output 146. Error amplifier 140 is configured to generate error signal VE at the output 146 based on a voltage level of feedback voltage VFB and a reference voltage level of reference voltage VREF. In some embodiments, a voltage level of feedback voltage VFB equals the voltage level of the voltage VOUT at the regulator output node 106. In some embodiments, regulator circuit 100 further includes a voltage divider (not shown) configured to convert a voltage level of voltage VOUT to a voltage level of feedback voltage VFB by a predetermined ratio. In some embodiments, voltage VREF has a voltage level between the power supply voltage level and the ground reference level.

Capacitive device 150 functions as a low-pass filter to stabilize voltage VOUT. Electrical characteristics of capacitive device 150 are represented by an equivalent series capacitance (depicted as a capacitor 152) and an equivalent series resistance (ESR, depicted as a resistor 154).

Figure 2:
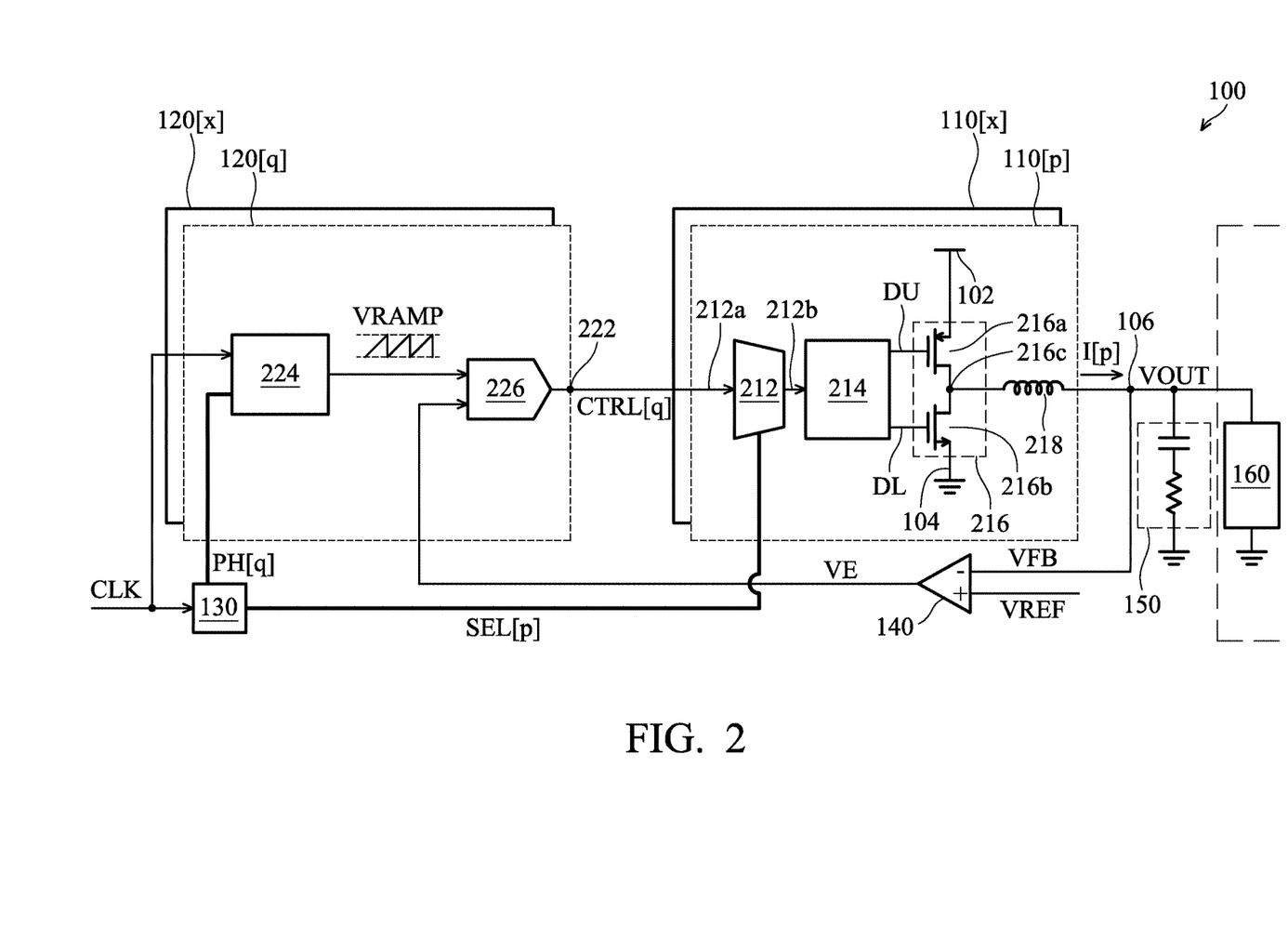
FIG. 2 is a circuit diagram of a portion of a regulator circuit in accordance with some embodiments.
Figure 3:
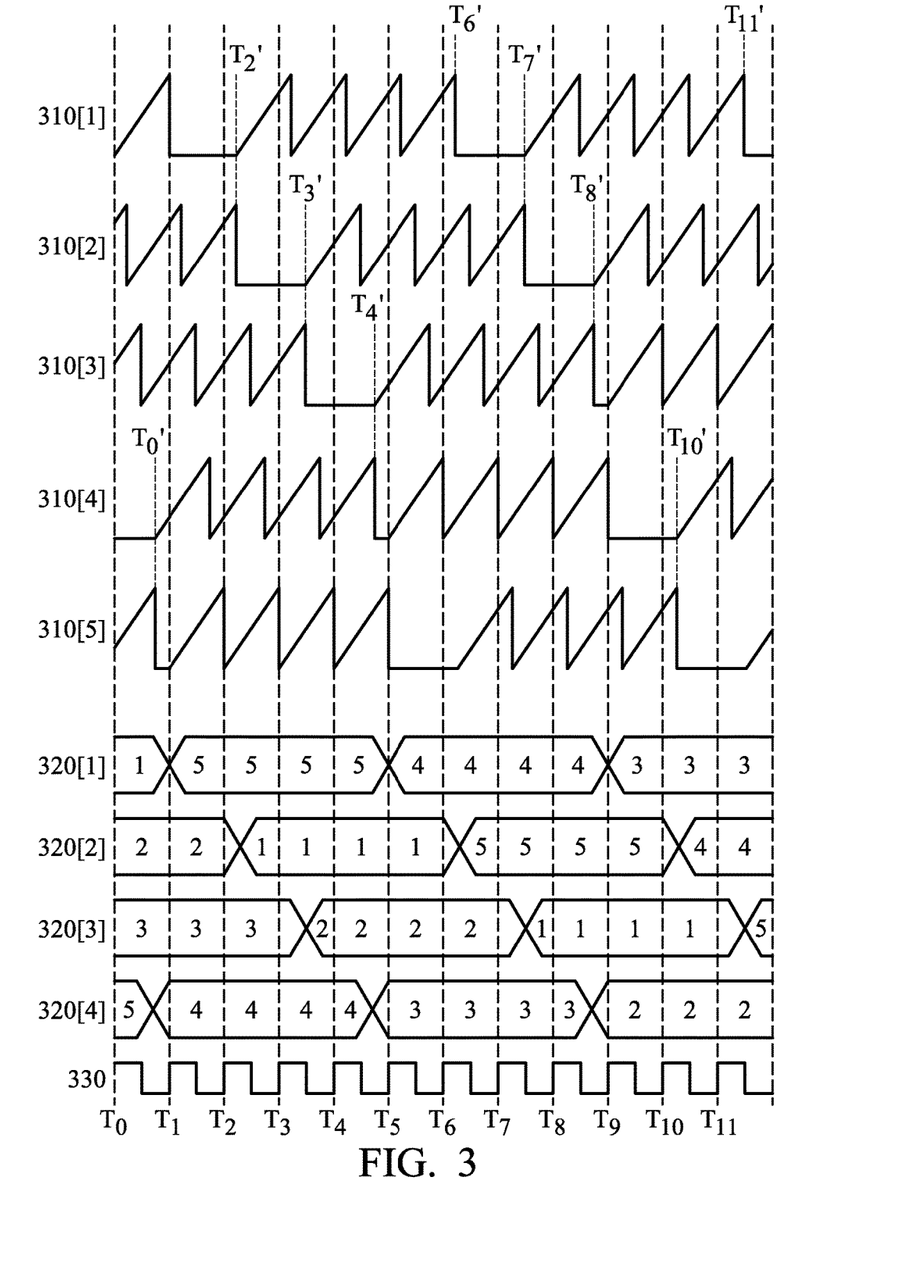
FIG. 3 is a timing diagram of logical values and waveforms at various nodes of a regulator circuit in accordance with some embodiments.

Details regarding drivers 110[N:1], regulator control circuits 120[(N+1):1], and task controller 130 are further illustrated in conjunction with FIGS. 2 and 3.

FIG. 2 is a circuit diagram of a portion of regulator circuit 100, with further details of one driver 110[p] and one regulator control circuit 120[q], in accordance with some embodiments. The index "q" is an integer ranging from 1 to (N+1). Drivers 110[N:1] other than driver 110[p] are correctively represented by box 110[x], and regulator control circuits 120[(N+1):1] other than regulator control circuit 120[q] are correctively represented by box 120[x]. Other components in FIG. 2 that are the same or similar to those in FIG. 1 are given the same reference numbers, and detailed description thereof is thus omitted.

Driver 110[p] includes a multiplexer 212 coupled with regulator control circuits 120[q] and 120[x] (i.e., regulator control circuits 120[(N+1):1]), a pre-driver stage 214 coupled with multiplexer 212, a driver stage 214 coupled between pre-driver stage 214 and regulator output node 106, and an inductive device 218 between driver stage 214 and regulator output node 106. Driver 110[p] is configured to provide a current I[p] to regulator output node 106.

Multiplexer 212 includes an input port 212a and an output port 212b. Input port 212a of multiplexer 212 is coupled with the output nodes 222 of regulator control circuits 120[(N+1):1] and configured to receive control signals CTRL[(N+1):1]. Responsive to selection signal SEL[p] from task controller 130, multiplexer 212 is set to couple the one of control signals CTRL[(N+1):1] corresponding to the p-th phase of N different phases with the output port of multiplexer 212, such as coupling control signal CTRL[q] from regulator control circuit 120[q] with the output port of multiplexer 212. As a result, driver 110[p] is set by task controller 130 to operate based on the control signal at the output port of multiplexer 212.

Pre-driver stage 214 is configured to generate control signals DU and DL in order to control the driver stage based on a signal on the output port 212b of the multiplexer 212. Driver stage 216 includes an upper driver 216a, a lower driver 216b, and an output node 216c between upper driver 216a and a lower driver 216b. Upper driver 216a is a P-type transistor coupled between output node 216c of driver stage 216 and first power supply node 102. Lower driver 216b is an N-type transistor coupled between output node 216c of driver stage 216 and second power supply node 104. In some embodiments, control signals DU and DL turns on one of the upper driver 216a or 216b in order to inject or withdraw current into or from regulator output node responsive to the control signal at the output port of multiplexer 212.

Moreover, inductive device 218 is between output node 216c of the driver stage 216 and the regulator output node 106. Inductive device 218, together with capacitive device 150, functions as a low-pass filter to stabilize voltage VOUT.

In some embodiments, each drivers 110[x] have a configuration equivalent to that of driver 110[p]. In some embodiments, drivers 110[x] and driver 110[p] (i.e., drivers 110[N:1]) are fabricated based on a common circuit schematic.

Regulator control circuit 120[q] includes output node 222, a ramp generator 224, and a comparator 226 coupled between output node 222 of regulator control circuit 120[q] and ramp generator 224. Ramp generator 224 is configured to receive clock signal CLK and a set of phase control signals PH[q] from task controller 130, and to generate a ramp signal VRAMP. Ramp signal is a triangular wave signal or a saw-tooth wave signal having one of the N different phases as designated by task controller 130 through phase control signal PH[q]. Comparator 226 is configured to generate a control signal CTRL[q] by comparing the ramp signal VRAMP and error signal VE generated based on a voltage level at the regulator output node 106 and a voltage level of reference voltage VREF. As such, control signal CTRL[q] is a pulse width modulation PWM signal corresponding to a phase of ramp signal VRAMP designated by task controller 130.

In some embodiments, each regulator control circuits 120[x] have a configuration equivalent to that of regulator control circuit 120[q]. In some embodiments, regulator control circuits 120[x] and regulator control circuit 120[q] (i.e., regulator control circuits 120[(N+1):1]) are fabricated based on a common circuit schematic.

FIG. 3 is a timing diagram of logical values and waveforms at various nodes of a regulator circuit, such as regulator circuit 100 when N is set to be four (4), in accordance with some embodiments. Waveforms 310[1]~310[5] variously represent the waveforms of ramp signals VRAM of regulator control circuits 120[1]~120[5]. In this embodiment, ramp signals VRAM of regulator control circuits 120[1]~120[5] are saw-tooth waveform signals. Equivalent decimal values 320[1]~320[4] variously represent the values of various sets of selection signals SEL[4:1]. Waveform 330 represents the waveform of clock signal CLK. Task controller 130 is configured to activate an idle regulator control circuit in place of a working regulator control circuit during each clock cycle of clock signal CLK.

For example, at time T0, regulator control circuit 120[1] is set to generate a ramp signal 310[1] having a phase being used to define the 0-degree phase; regulator control circuit 120[2] is set to generate a ramp signal 310[2] having a 90-degree phase; regulator control circuit 120[3] is set to generate a ramp signal 310[3] having a 180-degree phase; regulator control circuit 120[4] is set to be idle; and regulator control circuit 120[5] is set to generate a ramp signal 310[5] having a 270-degree phase. Also, the value of selection signal SEL[1] is set to '1' (320[1]) to couple control signal CTRL[1] from regulator control circuit 120[1] to pre-driver stage 214 of driver 110[1]; selection signal SEL[2] is set to '2' (320[2]) to couple control signal CTRL[2] from regulator control circuit 120[2] to pre-driver stage 214 of driver 110[2]; selection signal SEL[3] is set to '3' (320[3]) to couple control signal CTRL[3] from regulator control circuit 120[3] to pre-driver stage 214 of driver 110[3]; and selection signal SEL[4] is set to '5' (320[4]) to couple control signal CTRL[5] from regulator control circuit 120[5] to pre-driver stage 214 of driver 110[4].

Moreover, within the clock cycle starting at time T0, control circuit 120[5] is going to be set to be idle, and the idle control circuit 120[4] is going to be set to take place of control circuit 120[5] and generate a ramp signal 310[4] having the 270-degree phase. At time T0' when the ramp signal 310[5] has a falling edge, task controller 130 alters the value 320[4] of selection signal SEL[4] from '5' to '4'. Accordingly, multiplexer 212 of driver 110[4] decouple control signal CTRL[5] from, and couple control signal CTRL[4] to, pre-driver stage 214 of driver 110[4]. The other value 320[1], 320[2], and 320[3] are unchanged.

Within the clock cycle starting at time T1, control circuit 120[1] is going to be set to be idle, and the idle control circuit 120[5] is going to be set to take place of control circuit 120[1] and generate a ramp signal 310[5] having the 0-degree phase. Because the ramp signal 310[1] has a falling edge at time T1, task controller 130 alters the value 320[1] of selection signal SEL[1] from '1' to '5' at time T1. Accordingly, multiplexer 212 of driver 110[1] decouple control signal CTRL[1] from, and couple control signal CTRL[5] to, pre-driver stage 214 of driver 110[1]. The other value 320[2], 320[3], and 320[4] are unchanged.

Within the clock cycle starting at time T2, control circuit 120[2] is going to be set to be idle, and the idle control circuit 120[1] is going to be set to take place of control circuit 120[2] and generate a ramp signal 310[1] having the 90-degree phase. At time T2' when the ramp signal 310[2] has a falling edge, task controller 130 alters the value 320[2] of selection signal SEL[2] from '2' to '1'. Accordingly, multiplexer 212 of driver 110[2] decouple control signal CTRL[2] from, and couple control signal CTRL[1] to, pre-driver stage 214 of driver 110[2]. The other value 320[1], 320[3], and 320[4] are unchanged.

Within the clock cycle starting at time T3, control circuit 120[3] is going to be set to be idle, and the idle control circuit 120[2] is going to be set to take place of control circuit 120[3] and generate a ramp signal 310[2] having the 180-degree phase. At time T3' when the ramp signal 310[3] has a falling edge, task controller 130 alters the value 320[3] of selection signal SEL[3] from '3' to '2'. Accordingly, multiplexer 212 of driver 110[3] decouple control signal CTRL[3] from, and couple control signal CTRL[2] to, pre-driver stage 214 of driver 110[3]. The other value 320[1], 320[2], and 320[4] are unchanged.

Within the clock cycle starting at time T4, control circuit 120[4] is going to be set to be idle, and the idle control circuit 120[3] is going to be set to take place of control circuit 120[4] and generate a ramp signal 310[3] having the 270-degree phase. At time T4' when the ramp signal 310[4] has a falling edge, task controller 130 alters the value 320[4] of selection signal SEL[4] from '4' to '3'. Accordingly, multiplexer 212 of driver 110[4] decouple control signal CTRL[4] from, and couple control signal CTRL[3] to, pre-driver stage 214 of driver 110[4]. The other value 320[1], 320[2], and 320[3] are unchanged.

Thereafter, at time T5, control circuit 120[5] is set to be idle, and the idle control circuit 120[4] is set to take place of control circuit 120[5] and generate a ramp signal 310[4] having the 0-degree phase. At time T6' after time T6, control circuit 120[1] is set to be idle, and the idle control circuit 120[5] is set to take place of control circuit 120[1] and generate a ramp signal 310[5] having the 90-degree phase. At time T7' after time T7, control circuit 120[2] is set to be idle, and the idle control circuit 120[1] is set to take place of control circuit 120[2] and generate a ramp signal 310[1] having the 180-degree phase. At time T8' after time T8, control circuit 120[3] is set to be idle, and the idle control circuit 120[2] is set to take place of control circuit 120[3] and generate a ramp signal 310[2] having the 270-degree phase.

Thereafter, at time T9, control circuit 120[4] is set to be idle, and the idle control circuit 120[3] is set to take place of control circuit 120[4] and generate a ramp signal 310[3] having the 0-degree phase. At time T10' after time T10, control circuit 120[5] is set to be idle, and the idle control circuit 120[4] is set to take place of control circuit 120[5] and generate a ramp signal 310[4] having the 90-degree phase. At time T11' after time T11, control circuit 120[1] is set to be idle, and the idle control circuit 120[5] is set to take place of control circuit 120[1] and generate a ramp signal 310[5] having the 180-degree phase.

As a result, each one of the regulator control circuits 120[5:1] is set to generate a control signal CTRL[5:1] corresponding to four different phases, such as 0-degree, 90-degree, 180-degree, and 270-degree phases, in a rotational manner. Also, multiplexers 212 of drivers 110[4:1]

such that a p-th driver is operated based on control signals corresponding to a p-th phase of the four different phases from the regulator control circuits 120[5:1] in a rotational manner. In the embodiment depicted in FIG. 3, each combination of regulator control circuits 120[5:1] and drivers 110[4:1] would repeat every 20 clock cycles. Therefore, the phase errors among control signals CTRL[5:1] caused by mismatch or process variations of regulator control circuits 120[5:1] are evenly distributed to drivers 110[4:1].

In the embodiment of FIG. 3, the timing for altering the values of selection signals SEL[4:1] is set at the time when a corresponding ramp signal VRAMP has a falling edge. As such, regulator control circuits 120[5:1] are switched when the PWM waveforms of control signals CTRL[5:1] have falling or rising edges. In some embodiments, if ramp signals VRAMP are triangular wave signals, the timing for altering the values of selection signals SEL[4:1] is set at the time when a corresponding ramp signal VRAMP has a peak value, such as at the highest peak or lowest peak. As such, regulator control circuits 120[5:1] are switched when the PWM waveforms of control signals CTRL[5:1] have a known logical value.

Figure 4A:
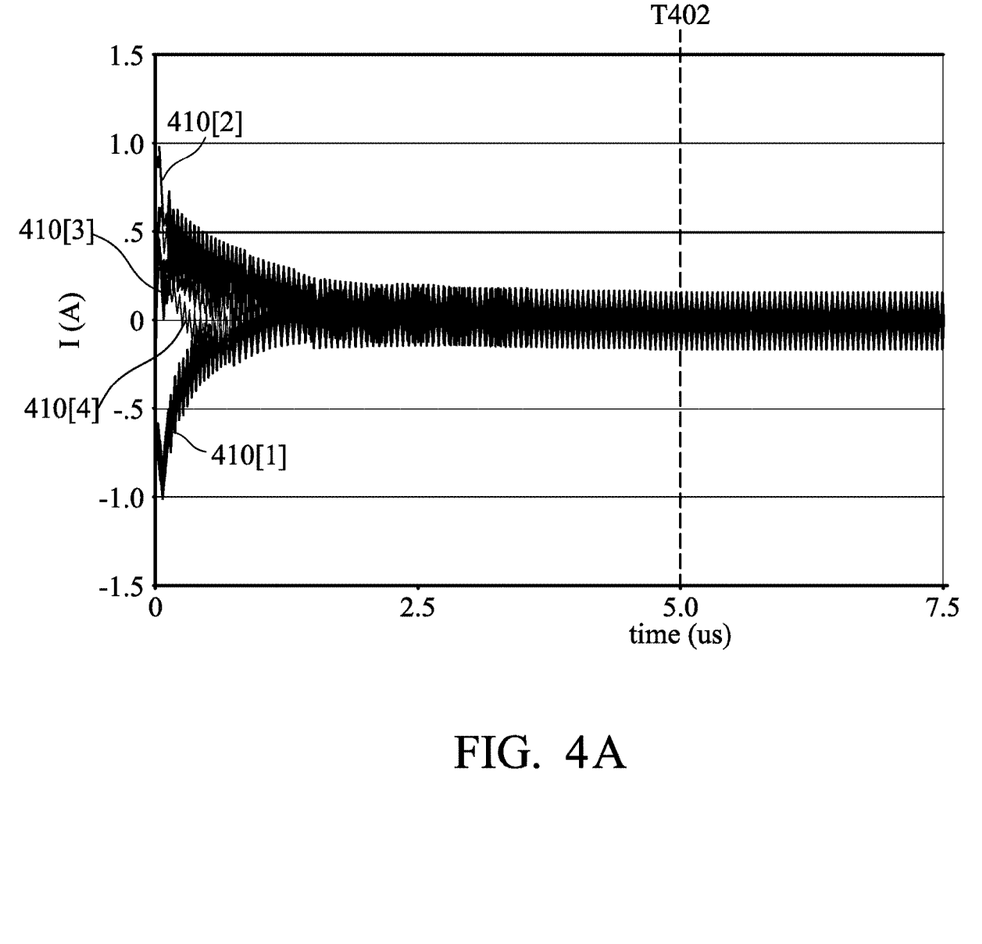
FIG. 4A is a graph of waveforms of various currents provided by different drivers of a regulator circuit in accordance with some embodiments.

FIG. 4A is a graph of waveforms of various currents I[N:1] provided by different drivers 110 [N:1] of a regulator circuit, such as regulator circuit 100 when N is set to be four (4), in accordance with some embodiments. Waveform 410[1] represents the waveform of current I[1]; waveform 410[2] represents the waveform of current I[2]; waveform 410[3] represents the waveform of current I[3]; and waveform 410[4] represents the waveform of current I[4]. After the regulator circuit is turned on and operates at a steady state (e.g., time T402), because the phase errors among control signals CTRL[5:1] of regulator control circuits 120[5:1] have been evenly distributed to drivers 110[4:1] in a time-averaged manner, the output current from each drivers 110[4:1] has the same root mean square (RMS) value.

Figure 4B:
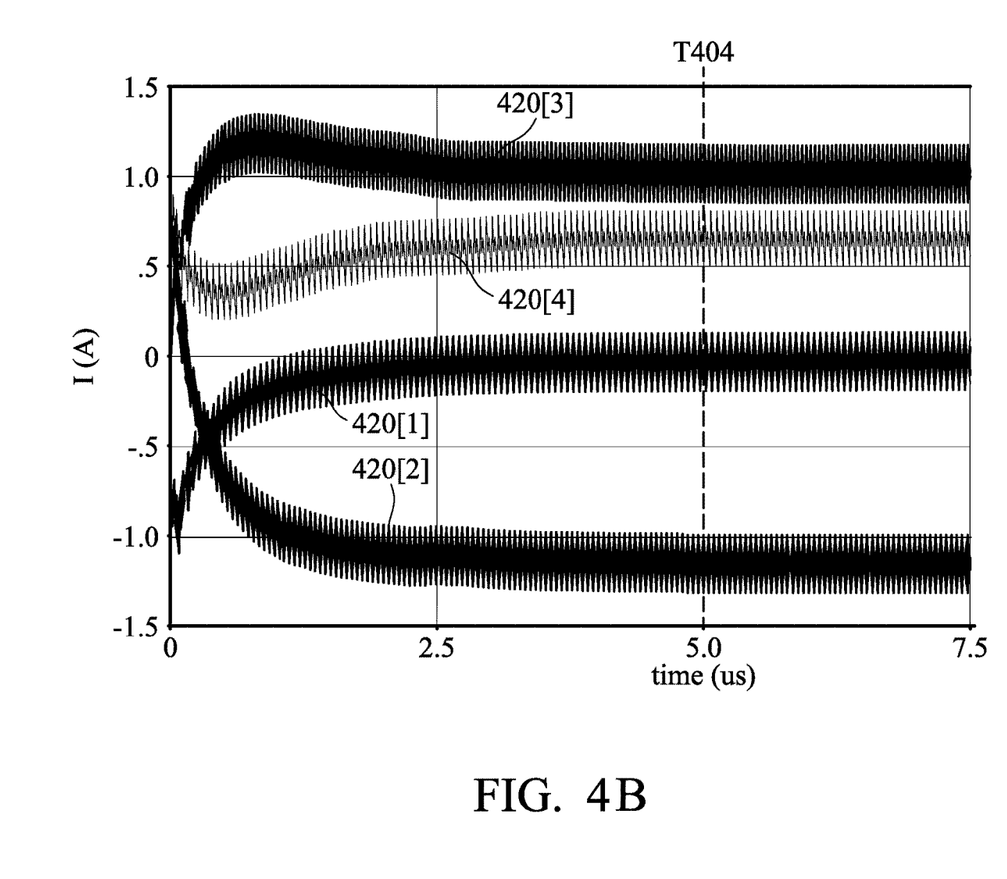
FIG. 4B is a graph of waveforms of various currents provided by different drivers of a regulator circuit having a configuration different from some embodiments of the present disclosure.

FIG. 4B is a graph of waveforms of various currents provided by different drivers of a regulator circuit having a configuration different from some embodiments of the present disclosure. In particular, the regulator circuit on which FIG. 4B is based does not rotate the use of regulator control circuits against drivers corresponding to different phases. Waveform 420[1] represents the waveform of a current corresponding to current I[1]; waveform 420[2] represents the waveform of a current corresponding to current I[2]; waveform 420[3] represents the waveform of a current corresponding to current I[3]; and waveform 420[4] represents the waveform of a current corresponding to current I[4]. After the regulator circuit of FIG. 4B is turned on and operates at a steady state (time T404), because the phase errors among control signals of regulator control circuits stay with corresponding drivers and are not evenly distributed to different drivers, the output current from each drivers has different RMS values as a result of the phase errors among control signals. In FIG. 4B, currents corresponding to waveforms 420[1] and 420[2] are in fact consuming energy rather than providing energy to the load. Thus, currents corresponding to waveforms 420[3] and 420[3] are not only responsible for providing the current for the load but also for compensating the energy consumed by the drivers of currents corresponding to waveforms 420[1] and 420[2].

Figure 5:
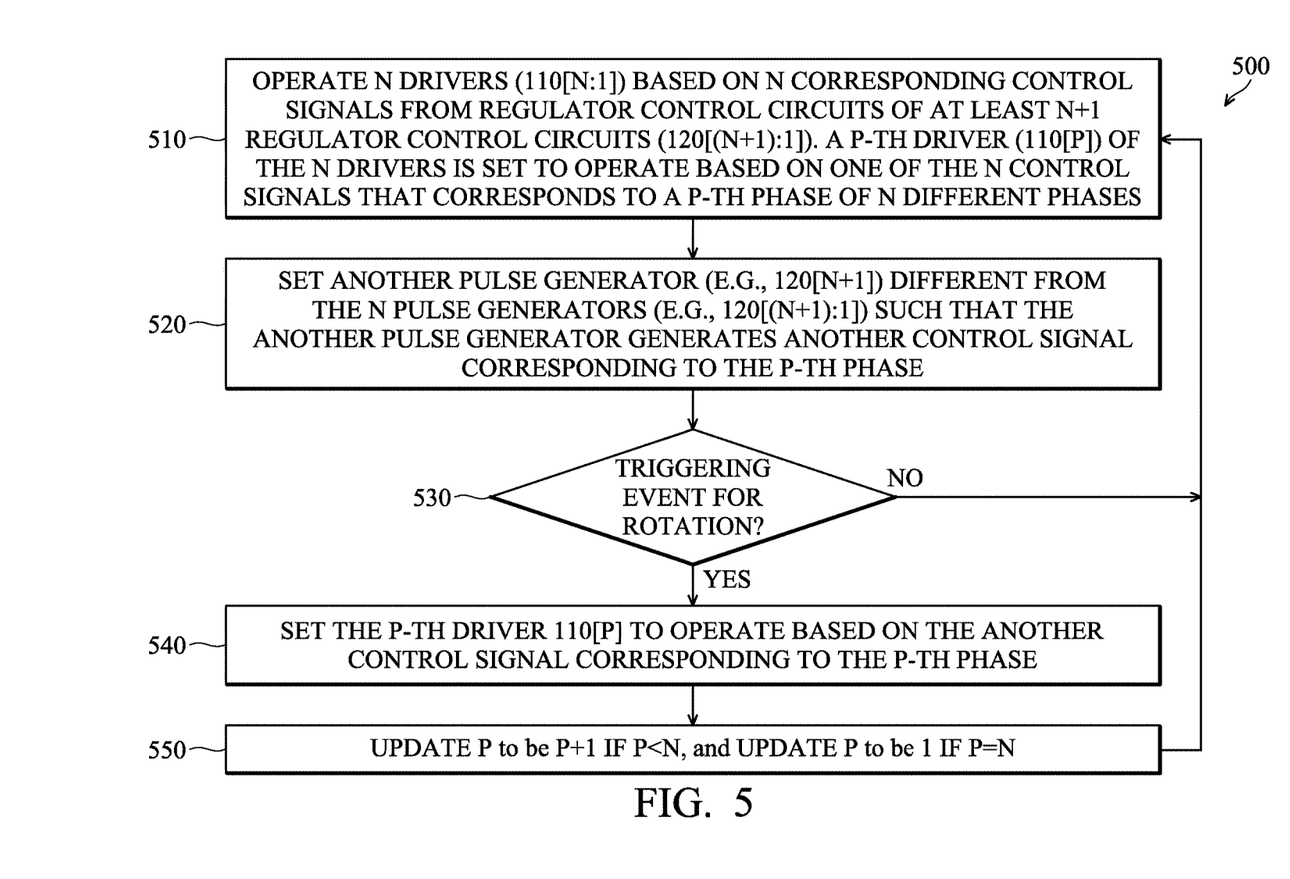
FIG. 5 is a flow chart of a method of operating a regulator circuit in accordance with some embodiments.

FIG. 5 is a flow chart of a method 500 of operating a regulator circuit in accordance with some embodiments. In some embodiments, method 500 is usable in conjunction with regulator circuit 100 of FIG. 1. It is understood that additional operations may be performed before, during, and/or after the method 500 depicted in FIG. 5, and that some other processes may only be briefly described herein.

The process starts with operation 510, where N drivers 110[N:1] are set to operate based on N corresponding control signals, such as control signals CTRL[N:1] from N regulator control circuits, e.g., control circuits 120[N:1], of at least (N+1) regulator control circuits 120[(N+1):1]. A p-th driver 110[p] of the N drivers is set to operate based on one of the N control signals that corresponds to a p-th phase of N different phases.

The process proceeds to operation 520, where another regulator control circuit of at least (N+1) regulator control circuits, e.g., control circuit 120[N+1], such that the another regulator control circuit 120[N+1] generates another control signal corresponding to the p-th phase of the N different phases.

In some embodiments, operation 520 is performed by setting each one of the at least (N+1) regulator control circuits 120[(N+1):1] to generate a control signal corresponding to the N different phases, one after another in a rotational manner.

The process proceeds to operation 530, where the occurrence of a triggering event for task rotation is determined. In some embodiments, the triggering event for task rotation is during each clock cycle of clock signal CLK when a corresponding ramp signal VRAMP has a falling edge. In some embodiments, the triggering event for task rotation is during each clock cycle of clock signal CLK when a corresponding ramp signal VRAMP has a peak value, such as at the highest peak or lowest peak.

Responsive to the occurrence of the triggering event, the process proceeds to operation 540; otherwise, the process proceeds to operation 510.

In operation 540, the p-th driver 110[p] is set to operate based on the another control signal corresponding to the p-th phase from the another regulator control circuit 120[N+1].

In some embodiments, operation 540 is performed by setting multiplexers 212 of the N drivers 110[N:1] such that the p-th driver 110[p] of the N drivers is operated based on control signals corresponding to the p-th phase of the N different phase from the at least (N+1) regulator control circuits 120[(N+1):1], one after another in a rotational manner.

In accordance with one embodiment, a regulator circuit comprises: a regulator output node; at least (N+1) regulator control circuits, N being an integer greater than 1; N drivers, each one of the N drivers including: a multiplexer having an input port and an output port, the input port of the multiplexer being coupled with output nodes of the at least (N+1) regulator control circuits; an adjuster circuit configured to adjust a level of a current supplied by the driver to the regulator output node; and a task controller. The task controller is configured to: set a first one of the N+1 regulator control circuits to be idle during a first cycle of a clock signal; and set a second one of the N+1 regulator control circuits to be idle during a second cycle of the clock signal.

In accordance with another embodiment, a regulator circuit comprises: a regulator output node; at least (N+1) regulator control circuits, N regulator control circuits of the at least (N+1) regulator control circuits being configured to variously generate N control signals corresponding to N different phases, and N being an integer and greater than 1; N drivers, a p-th driver of the N drivers being configured to provide a p-th current to the regulator output node based on a corresponding control signal of the N control signals that corresponds to a p-th phase of the N different phases, p being an integer ranging from 1 to N, each one of the N drivers including: a multiplexer having an input port and an output port, the input port of the multiplexer being coupled with output nodes of the at least (N+1) regulator control circuits; and a task controller coupled to the multiplexers of the N drivers and to the at least (N+1) regulator control circuits. The task controller is configured to: make idle one among the at least (N+1) regulator control circuits resulting in a remaining at least (N) activated regulator control circuits during each cycle of a clock signal; select which among the at least (N+1) regulator control circuits will be made idle according to a predetermined rotation of the at least (N+1) regulator control circuits; and set the p-th driver to provide the p-th current based on the control signal of the N control signals that corresponds to the p-th phase.

In accordance with yet another embodiment, a method of operating a regulator circuit is provided, the method comprising: selecting N regulator control circuits from at least (N+1) regulator control circuits; and operating N drivers based on N corresponding control signals from the selected N regulator control circuits. The selecting N regulator control circuits includes: setting a first one of the N+1 regulator control circuits to be idle during a first cycle of a clock signal; and setting a second one of the N+1 regulator control circuits to be idle during a second cycle of the clock signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A regulator circuit, comprising:
a regulator output node;
at least (N+1) regulator control circuits, N being an integer greater than 1;
N drivers, each one of the N drivers including:
  a multiplexer having an input port and an output port, the input port of the multiplexer being coupled with output nodes of the at least (N+1) regulator control circuits;
an adjuster circuit configured to adjust a level of a current supplied by the driver to the regulator output node; and
a task controller configured to:
  set a first one of the N+1 regulator control circuits to be idle during a first cycle of a clock signal; and
  set a second one of the N+1 regulator control circuits to be idle during a second cycle of the clock signal.

2. The regulator circuit of claim 1, wherein:
the task controller is coupled with the multiplexers of the N drivers and the at least (N+1) regulator control circuits; and
the task controller is further configured to:
  set the multiplexers of the N drivers such that a p-th driver of the N drivers is operated based on control signals corresponding to a p-th phase of the N different phases from the at least (N+1) regulator control circuits in a rotational manner, p being an integer ranging from 1 to N; and set each one of the at least (N+1) regulator control circuits to generate a control signal corresponding to the N different phases in a rotational manner.

3. The regulator circuit of claim 2, wherein:
each of the at least (N+1) regulator control circuits of the at least (N+1) regulator control circuits includes:
  a ramp generator configured to generate a ramp signal having a phase; and
one of the at least (N+1) regulator control circuits comprises:
  the ramp generator configured to generate the ramp signal, the ramp being a triangular wave signal or a saw-tooth wave signal; and
  a comparator configured to generate the control signal of the one of the at least (N+1) regulator control circuits by comparing the ramp signal and an error signal generated based on a voltage level at the regulator output node.

4. The regulator circuit of claim 1, further comprising:
an error amplifier configured to generate an error signal based on a voltage level at the regulator output node and a reference voltage level,
wherein the at least (N+1) regulator control circuits are configured to receive the error signal.

5. The regulator circuit of claim 1, wherein:
the adjuster circuit includes:
  a driver stage coupled with the regulator output node; and
  a pre-driver stage configured to control the driver stage based on a signal on the output port of the multiplexer; and
each one of the N drivers further comprises:
  an inductive device between an output node of the driver stage of the adjuster circuit and the regulator output node.

6. The regulator circuit of claim 1, wherein:
the adjuster circuit includes:
  a driver stage coupled with the regulator output node; and
  a pre-driver stage configured to control the driver stage based on a signal on the output port of the multiplexer; and
the driver stage of one of the N drivers includes:
  an upper driver coupled between an output node of the driver stage and a first power supply node, the first power supply node being configured to carry a supply voltage level; and
  a lower driver coupled between the output node of the driver stage and a second power supply node, the second power supply node being configured to carry a ground reference level lower than the supply voltage level.

7. The circuit of claim 6, further comprising:
an error amplifier configured to generate an error signal based on a voltage level at the regulator output node and a reference voltage level, the reference voltage level being between the supply voltage level and the ground reference level.

8. The circuit of claim 1, wherein:
the N drivers are fabricated based on a first common circuit schematic; and
the at least (N+1) regulator control circuits are fabricated based on a second common circuit schematic.

9. A regulator circuit, comprising:
a regulator output node;
at least (N+1) regulator control circuits, N regulator control circuits of the at least (N+1) regulator control circuits being configured to variously generate N control signals corresponding to N different phases, and N being an integer and greater than 1;

N drivers, a p-th driver of the N drivers being configured to provide a p-th current to the regulator output node based on a corresponding control signal of the N control signals that corresponds to a p-th phase of the N different phases, p being an integer ranging from 1 to N, each one of the N drivers including:

a multiplexer having an input port and an output port, the input port of the multiplexer being coupled with output nodes of the at least (N+1) regulator control circuits; and a task controller coupled to the multiplexers of the N drivers and to the at least (N+1) regulator control circuits, the task controller being configured to:

make idle one among the at least (N+1) regulator control circuits resulting in a remaining at least (N) activated regulator control circuits during each cycle of a clock signal;

select which among the at least (N+1) regulator control circuits will be made idle according to a predetermined rotation of the at least (N+1) regulator control circuits; and set the p-th driver to provide the p-th current based on the control signal of the N control signals that corresponds to the p-th phase.

10. The regulator circuit of claim 9, further comprising:
an error amplifier configured to generate an error signal based on a voltage level at the regulator output node and a reference voltage level,
wherein the at least (N+1) regulator control circuits are configured to receive the error signal.

11. The regulator circuit of claim 10, wherein one of the at least (N+1) regulator control circuits comprises:
a ramp generator configured to generate a ramp signal, the ramp being a triangular wave signal or a saw-tooth wave signal having one of the N different phases set by the task controller; and
a comparator configured to generate a control signal by comparing the ramp signal and an error signal generated based on a voltage level at the regulator output node.

12. The regulator circuit of claim 9, wherein each of the N drivers further includes:
a driver stage configured to provide the p-th current; and
a pre-driver stage configured to control the driver stage based on a control signal corresponding to the p-th phase of the N different phases.

13. The regulator circuit of claim 12, wherein the p-th driver of the N drivers further comprises:
an inductive device between an output node of the driver stage and the regulator output node.

14. The regulator circuit of claim 12, wherein the driver stage of the p-th driver of the N drivers comprises:
an upper driver coupled between an output node of the driver stage and a first power supply node, the first power supply node being configured to carry a supply voltage level; and
a lower driver coupled between the output node of the driver stage and a second power supply node, the second power supply node being configured to carry a ground reference level lower than the supply voltage level.

15. The regulator circuit of claim 14, further comprising:
an error amplifier configured to generate an error signal based on a voltage level at the regulator output node and a reference voltage level, the reference voltage level being between the supply voltage level and the ground reference level.

16. The regulator circuit of claim 9, wherein
the N drivers are fabricated based on a first common circuit schematic; and
the at least (N+1) regulator control circuits are fabricated based on a second common circuit schematic.

17. A method of operating a regulator circuit, the method comprising:
selecting N regulator control circuits from at least (N+1) regulator control circuits, N being an integer greater than 1; and
operating N drivers based on N corresponding control signals from the selected N regulator control circuits, each of the N control signals being based on feedback of an output of the regulator circuit;
wherein the selecting N regulator control circuits includes:
setting a first one of the N+1 regulator control circuits to be idle during a first cycle of a clock signal;
setting a second one of the N+1 regulator control circuits to be idle during a second cycle of the clock signal;
choosing a p-th driver of the N drivers to be operated based on one control signal of the N control signals corresponding to a p-th phase of N different phases, N being an integer and greater than 1, p being an integer ranging from 1 to N, and the one control signal being generated by a first regulator control circuit of the at least (N+1) regulator control circuits; and
choosing another regulator control circuit of the at least (N+1) regulator control circuits such that the another regulator control circuit generates another control signal corresponding to the p-th phase of the N different phases; and
responsive to a triggering event:
setting the p-th driver to operate based on the another control signal corresponding to the p-th phase from the another regulator control circuit; and
setting the first regulator control circuit of the at least (N+1) regulator control circuits to an idle state.

18. The method of claim 17, wherein the choosing another regulator control circuit includes:
setting each one of the at least (N+1) regulator control circuits to generate a control signal corresponding to the N different phases, one after another in a rotational manner.

19. The method of claim 17, wherein the setting the p-th driver to operate based on the another control signal includes:
setting multiplexers of the N drivers such that the p-th driver of the N drivers is operated based on control signals corresponding to the p-th phase of the N different phases from the at least (N+1) regulator control circuits, one after another in a rotational manner.

20. The method of claim 17, further comprising:
generating N ramp signals which correspondingly have the N different phases, each of the N ramp signals being a triangular wave signal or each of the N ramp signals being a saw-tooth wave signal; and
comparing the N ramp signals against an error signal to produce the corresponding N control signals, the error signal being on a voltage level at the regulator output node.

* * * * *